United States Patent [19]

Stevenson, Jr.

[11] 4,041,485
[45] Aug. 9, 1977

[54] SPLIT GATE TRACKER USING BIPOLAR CONVERTER

[75] Inventor: Howard R. Stevenson, Jr., Herkimer, N.Y.

[73] Assignee: General Electric Company, Utica, N.Y.

[21] Appl. No.: 641,458

[22] Filed: Dec. 17, 1975

[51] Int. Cl.² ............................................... G01S 9/16
[52] U.S. Cl. .................................................... 343/7.3
[58] Field of Search ...................................... 343/7.3

[56] References Cited

U.S. PATENT DOCUMENTS

| | | | |
|---|---|---|---|
| 2,577,536 | 12/1951 | MacNichol, Jr. | 343/7.3 |
| 3,078,457 | 2/1963 | Himler et al. | 343/7.3 |
| 3,648,286 | 3/1972 | Schoneborn | 343/7.3 |
| 3,778,827 | 12/1973 | Strenglein | 343/7.3 |
| 3,879,730 | 4/1975 | Arsem | 343/7.3 |
| 3,962,703 | 6/1976 | Collot et al. | 343/7.3 |

OTHER PUBLICATIONS

Training Manual, "XM163,20MM Antiaircraft System (SP), Fire Control Operation and Maintenance (vol. 1)", General Electric, Burlington, Vermont, May 31, 1967, pp. 5-68 thru 5-88 & FIGS. 5-22 through 5-26, FIGS. 5-131, FIGS. 6-5-10.

*Primary Examiner*—Malcolm F. Hubler

[57] ABSTRACT

A split gate radar pulse tracking circuit employs sequential and contiguously generated early and late gate sampling pulses for sampling a radar video signal containing a target pulse to be tracked in range. The video signal is fed into a first (X) input port of an integrated circuit multiplier and the early and late gate pulses are fed into the positive and negative terminals of the second (Y) multiplier input port. The gain networks of the multiplier are set so that when the early and late gate pulses are not present, the gain of the Y channel is 0 and the multiplier output is also 0. When a sampling pulse is present, the gain of the Y channel is 1 and the multiplier output is a replica of the video input. Because the early and late gate pulses are fed to positive and negative multiplier inputs, presentation of the late gate pulse reverses the polarity at the multiplier output. The latter is fed to an integrating amplifier which has its output fed back to control the time of occurrence of the early and late gate pulses whereby the timing of the early and late gate pulses is servoed to track the target pulse. The output of the integrating amplifier represents the range of the target pulse.

5 Claims, 6 Drawing Figures

SPLIT GATE TRACKER USING BIPOLAR CONVERTER

BACKGROUND OF THE INVENTION

This invention relates to pulse tracking systems and, more particularly, to a split gate pulse tracking system for automatically tracking a radar-detected target in range. The invention herein described was made in the course of or under a contract or subcontract thereunder, (or grant) with the Department of Defense.

Split gate range tracking systems having been known since the early 1940's when the principles of automatic radar range tracking were discovered by W.C. Hahn. See U.S. Pat. No. 3,103,661. The basic principle of split gate range tracking involves the use of a pair of sequentially generated, contiguous gating pulses usually referred to as "early gate" and "late gate" sampling pulses. The system includes a servo loop which operates to adjust the time of occurrence of the early and late gate pulses so that they remain centered on the pulse which is being tracked. "Centering" of these pulses means that the trailing edge of the early gate pulse (which substantially coincides with the leading edge of the late gate pulse) is controlled in time by the servo loop so that it substantially coincides with the center of the target pulse.

The circuit techniques which have generally been employed for controlling such a servo loop have included the use of a pair of switching circuits controlled by the early and late gate pulses arranged to feed type of capacitive charge network (sample and hold). When the early gate switch turns on, the capacitive network charges to a level determined by the video signal then present. A second such arrangement is controlled by the late gate. The signal level stored in the two sample and hold networks following termination of the late gate are compared and the difference is utilized as an error signal to drive the servo loop to readjust the timing of the gates.

A difficulty with this arrangement is that the capacitive networks used to sample and hold the video signal tend to be "end reading". This means that the charge level stored on the capacitor essentially represents the level of the video signal at the instant that the early or late gate pulse terminated. The servo system, in seeking to equalize the levels stored on the early and late gate capacitors, tends to center the late gate sampling pulse, rather than its leading edge, on the target pulse. If the time constants of the capacitive sampling networks are increased in an effort to impart integrating characteristics to the networks, the voltage levels reached by the capacitors during the sampling interval become very small and the consequent accuracy requirements for the other circuits in the loop becomes much greater. This tends to make the system more complex and expensive.

An alternate technique that is sometimes employed includes the use of a pair of matched, complementary video channels. These may be sampled by early and late gate controlled switches and the outputs therefrom fed to an integrating amplifer. The principal difficulty with this arrangement is that it is very difficult to obtain precisely matched complementary video channels without utilizing rather involved and expense circuit components.

OBJECTS AND FEATURES OF THE INVENTION

It is therefore an object of the present invention to provide an improved split gate pulse tracking system which employs only low cost, readily available standard circuit components.

Another object is to provide an improved pulse tracking system of the type described which eliminates the "end reading" problem inherent in systems employing capacitive sampling networks.

Still another object is to provide an improved system of the type described which is capable of operation over a wide range of temperature conditions without the need for external temperature compensation adjustments.

Still a further object is to provide an improved system of the type described which operates with a high degree of reliability and is easily maintainable through simple and inexpensive maintenance procedures.

In accordance with the invention, early and late gate sampling is effected in a pulse tracking servo system through the use of an inexpensive multiplying circuit which operates to perform a bipolar conversion on the video input signal and to feed a bipolar signal to an integrating amplifier which produces an output representing the range of the target pulse.

These and other objects, features and advantages will be made apparent by the following detailed description of a preferred embodiment of the invention, the description being supplemented by drawings as follows:

DETAILED DESCRIPTION OF EMBODIMENT

Figure 1:
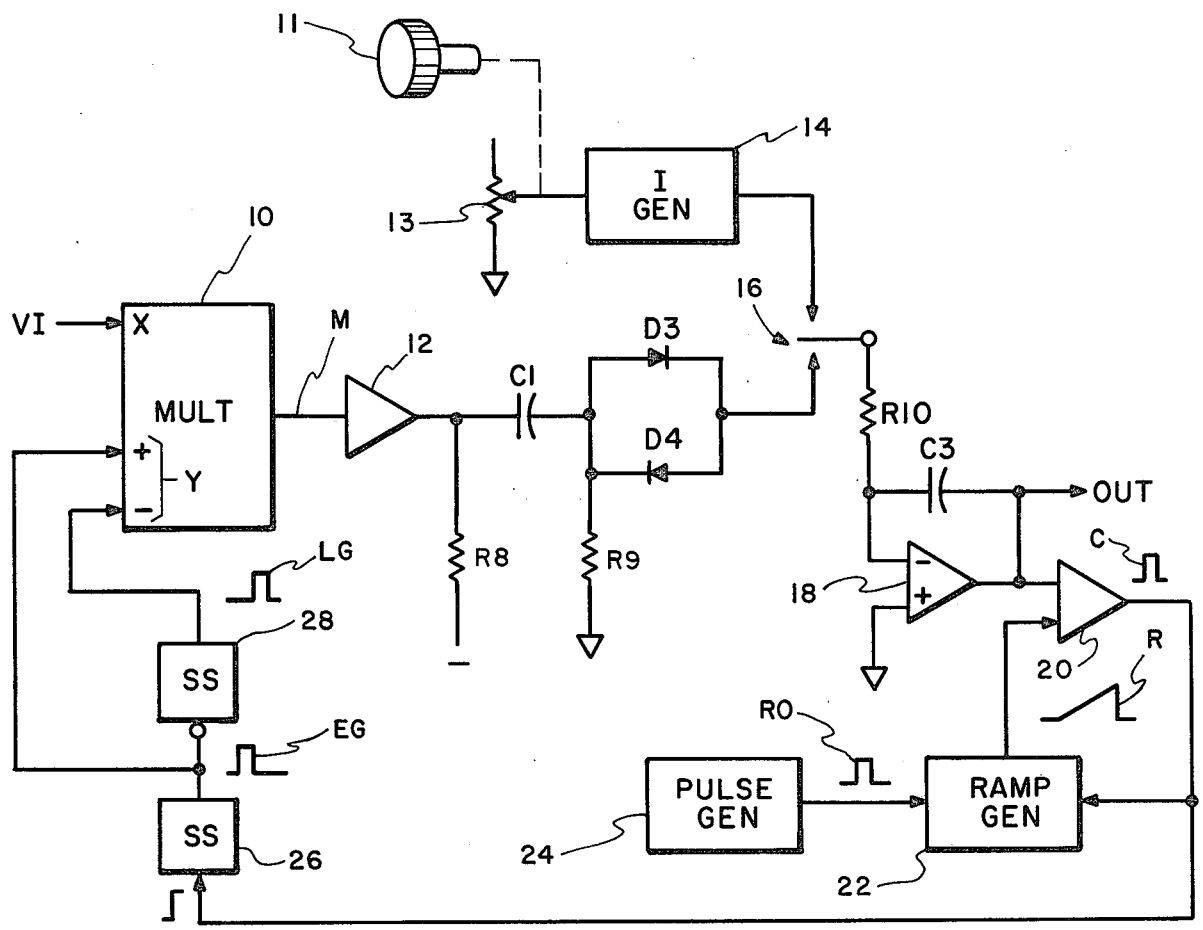
FIG. 1 is a schematic circuit illustrating a preferred embodiment of a pulse tracking servo constructed in accordance with the invention.

FIG. 1 shows a pulse tracking loop including a multiplier circuit 10 having a pair of input ports X and Y. A radar video input signal VI is applied from the radar receiver circuits (not shown) to the X input port of the multiplier. The signal VI has been stripped from the I.F. carrier and is an amplitude modulated signal representing the reflected radar energy detected at the receiver. Port Y has a positive terminal and a negative terminal for applying opposite polarity inputs to the multiplier. The multiplier output signal M is applied through a buffer amplifier 12, AC coupling network R8-C1-R9 and a pair of coupling diodes D3-D4 to a first contact terminal of a single pole, double throw control switch 16. When the latter is in its lower position the contract arm thereof applies the multiplier output signal M to an integrating amplifier 18 through an input resistor R10.

The output signal OUT produced by integrating amplifier 18 is applied to a first input of a comparator amplifier 20. The second input of amplifier 20 receives a ramp signal R from a ramp signal generator 22. Ramp generator 22 is triggered each radar sweep cycle by a "range zero" pulse RO produced by a pulse generator 24. When the level of the ramp signal reaches a level equal to the signal OUT, comparator 20 produces an output pulse C which is fed to reset ramp generator 22 so that ramp signal R is restored to zero. The signal C is also fed to a single-shot multivibrator circuit 26 which generates an early sampling pulse EG in response to the leading edge of the comparator output signal. A trailing edge single-shot 28 responds to the trailing edge of early gate signal EG to produce a late gate sampling pulse LG. The two sampling pulses are of equal amplitude and duration. Early gate pulse EG is applied to the positive terminal of multiplier input port Y and the late gate pulse LG is applied to the negative terminal.

When control switch 16 is switched to its upper position, the pulse tracking loop is broken and the input to integrating amplifier 18 is supplied by a current generator 14. The current signal supplied by generator 14 is controlled through a potentiometer 13 and manually operable control knob 11. This manual input controls the level of output signal OUT and thus determines the time during each radar sweep cycle when the comparator output signal C is generated. The pulse C may be used to generate a range indication cursor on the PPI (plan position indicator) cathode ray tube (CRT) display used to display the radar signal VI.

OPERATION

Figure 2:
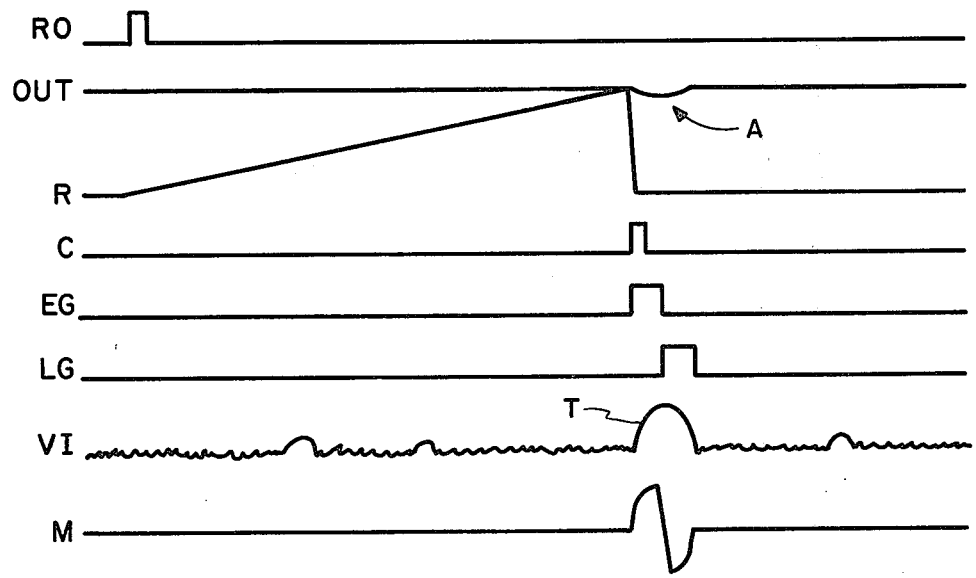
FIGS. 2, 3 and 4 are waveform diagrams useful in understanding the operation of the circuit of FIG. 1.

Referring to FIGS. 1 and 2, operation of the preferred embodiment is hereinafter described. A typical radar system employing the tracking loop of the invention transmits pulsed rf energy to detect targets in its field of view. After the transmission of each pulse, the radar receiver generates a video signal which represents all radar returns (signal reflections) received from the transmitted pulse. The first-received signal reflections represent objects close to the receiver while reflections manifested in the later portion of the video signal represent objects more remote from the receiver. The portion of the video signal representing the signal return from one transmitted pulse is referred to as a single radar range sweep.

The video signal representing successive radar range sweeps is displayed on a PPI CRT display console by modulating the CRT beam as it sweeps through a polar coordinate scan raster. Targets appear on the screen as "blips" and the position of each blip on the screen represents the range and azimuth of the target with respect to the radar receiver.

In many applications it is desirable to permit the operator of the radar set to select a particular target blip and to command the radar set to automatically track the target and provide a readout of its precise range on a continuous basis throughout the tracking operation. It is further desirable to provide a cursor symbol on the CRT screen that represents the position of the selected target so that the operator will be able to observe the target even though the detected pulse echo may occasionally fade or be obscured to the point where it is difficult to observe on the CRT.

In the system of FIG. 1, pulse generator 24 produces a pulse R0 at the beginning of each radar range sweep. The R0 signal designates the so-called zero range point on the display. The leading edge of R0 triggers ramp generator 22 so that the ramp signal R produced at the output thereof begins to ramp up. This is shown in FIG. 2. The video input signal VI received immediately following the R0 pulse represents reflections from objects located along the path of the radar beam at successively more remote distances from the transmitter. It is desired to track target pulse T in range.

To do this, the radar set operator throws control switch 16 to its upper position and adjusts knob 11 until the range cursor on the CRT display (generally by comparator output pulse C) overlies the blip generated by target pulse T. Thereafter, the operator transfers switch 16 to its lower position. The first comparator output pulse C thereafter generated triggers single-shot 26 (FIG. 1) and generates the early sampling gate EG and immediately thereafter single-shot 28 generates the late sampling gate LG. During the time that EG is high the Y channel gain of multiplier 10 is plus 1 and the multiplier output signal M reproduces the portion of the target pulse T that occurred during the EG time interval (FIG. 2). When LG comes up, the Y channel gain of multiplier instantaneously switches to -1 and the multiplier output signal M reproduces the remaining portion of target pulse T as a negative signal. The multiplier 10 thus operates to convert the sampled portion of VI into a bipolar signal M.

If the early and late gate signals EG and LG are centered on the target plus T, which is the condition depicted in FIG. 2, the positive and negative swings in the multiplier output signal M will be substantially identical in amplitude and duration. Since M is fed to the negative input port of amplifier 18 the positive excursion of M will decrease the signal level stored in the integrating capacitor C3 and thus OUT will drop. However, the negative excursion of M will bring OUT back up by a like amount and the final level of OUT will not be changed. This is illustrated at A in FIG. 2. Thus, the next early and late gate pair will be generated at the same relative time in the ensuing range sweep cycle and the result will be the same so long as the target pulse T occurs at the same relative time (range) in that sweep.

Figure 3:
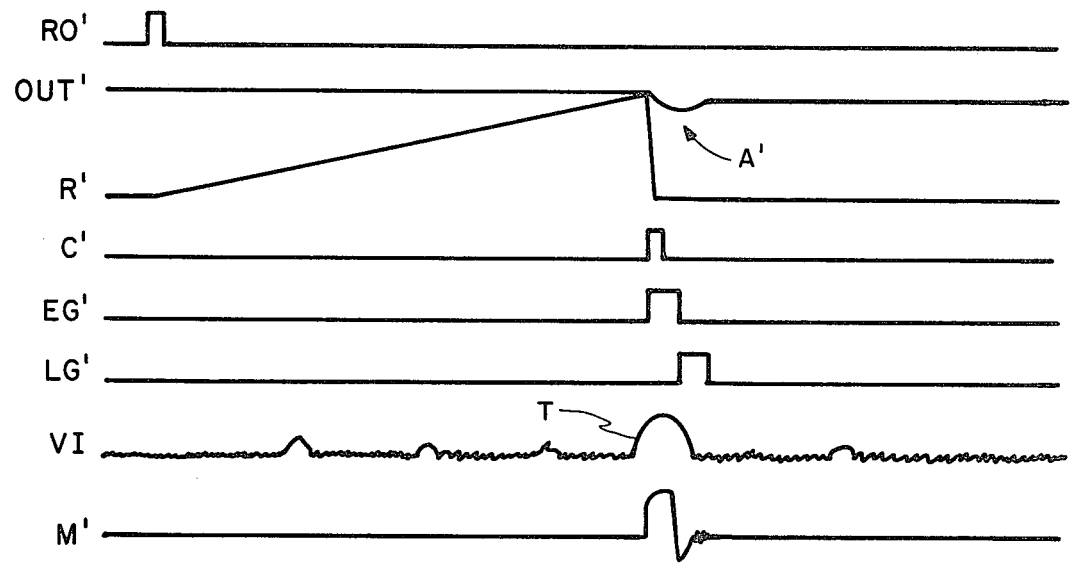

If the range of pulse T is closing, the ensuing sweep cycle results in the situation depicted in FIG. 3. The trailing edge of the next early gate pulse EG' occurs slightly after the center of target pulse T. The output M' of multiplier 10 swings strongly positive during EG'. However, during LG' only a small portion of the T pulse is left and the negative swing of M' is of lesser amplitude and duration as shown in FIG. 3. The result is that M' causes output signal OUR' to shift more negative than positive during the sampling intervals and OUT' experiences a net negative offset as shown at A'. This means that during the ensuing range sweep cycle the ramp signal does not reach as high a value and the early and late gate pulses are triggered by the C pulse at a slightly earlier time to correct for the timing error.

Figure 4:
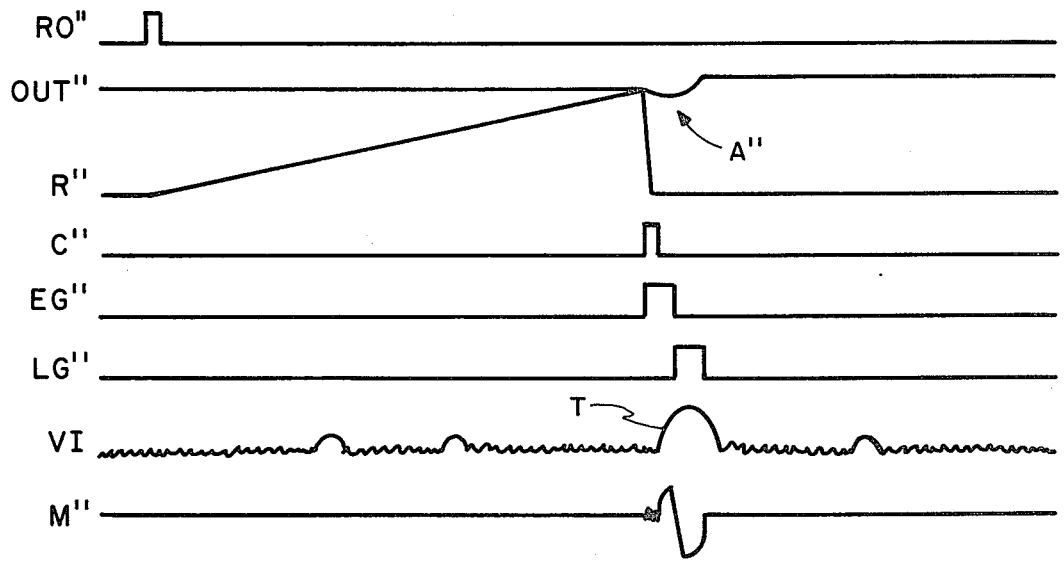

Of course, the condition resulting from early timing of the split gate sampling interval (range of T increasing) causes an opposite correction as shown in FIG. 4. Because the distribution of the target pulse T is more heavily concentrated during the late gate interval LG'', the output signal M'' from the multiplier exhibits a stronger negative swing than positive swing. This results in ouput signal OUT'' being offset in the positive direction as shown at A''. This means that the next gating interval will take place at a relatively later time during the range sweep cylce whereupon the system tends to correct for the timing error.

The negative feedback control thus imposed on the timing of the gate results in continuous correction of the timing error that exists with respect to the target pulse such that the center of the early-late gate sampling interval tracks the center of the target pulse T. The output signal OUT can be used to generate a digital range display as well as to provide a range input signal to a system such as an automatic gun fire control. The time interval between the leading edge of RO and the comparator output pulse C is also a measure of target range and can be used in a similar fashion.

Figure 5:
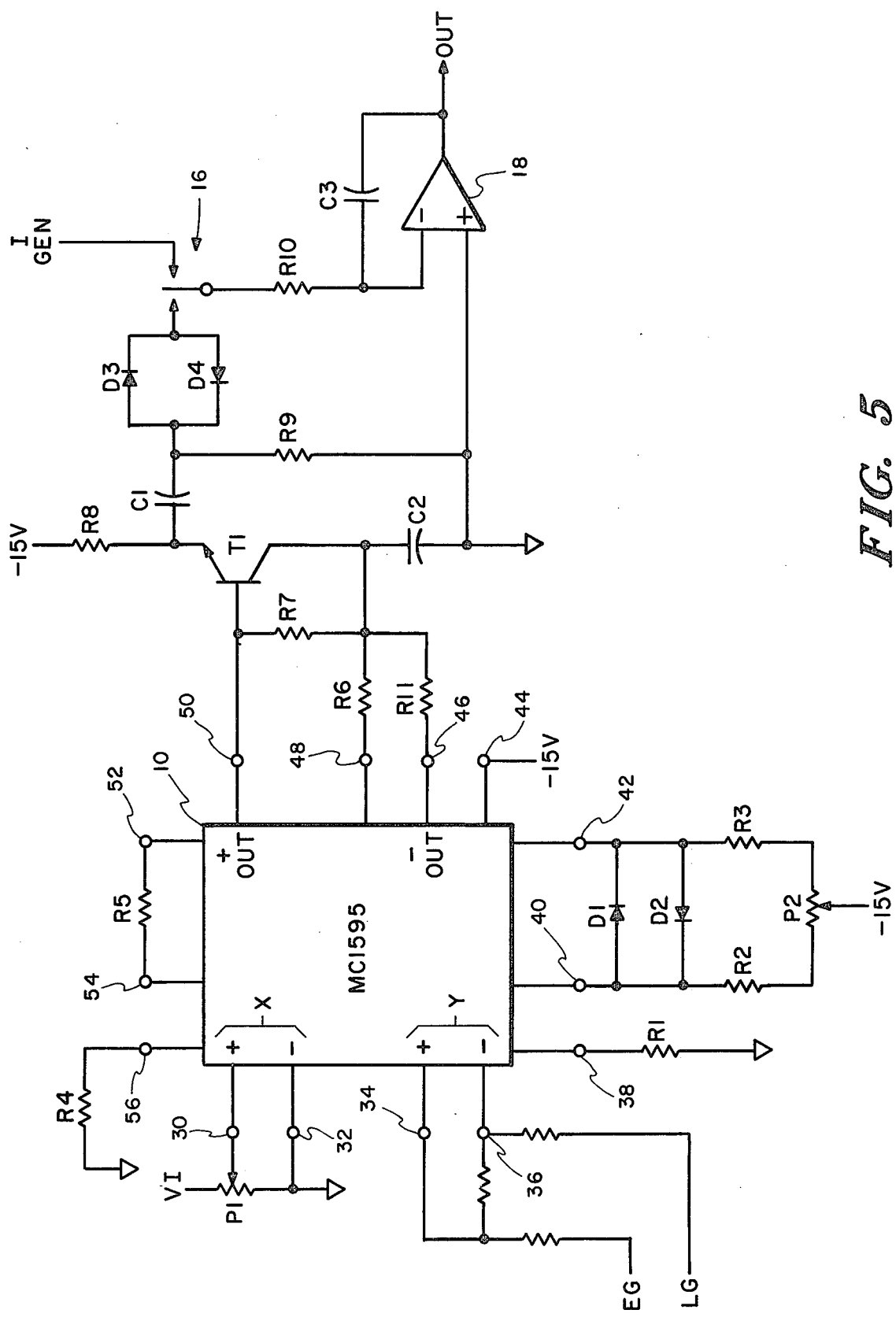
FIG. 5 is a detailed circuit schematic of the multiplying and integrating portions of the circuit of FIG. 1.

FIG. 5 shows the circuit details of the multiplier 10 and its connection to integrating amplifier 18. The multiplier circuit shown is a model MC 1595 (Motorola) integrated circuit multiplier. This circuit is a standard, readily available item which is relatively inexpensive. All the circuits of the multiplier are included on a single integrated circuit chip so that balanced operation of the circuit may be realized over a wide temperature range. Maintenance and repair of the circuit is simplified due to the fact that the multiplier may be quickly and inexpensively replaced. The X input port of the multiplier includes positive and negative terminals 30, 32 which are connected to receive the video input signal VI through a potentiometer P1 which is provided to allow matching of the maximum video amplitude to the dynamic range of the multiplier input. The Y multiplier input port includes positive and negative terminals 34, 36 which are connected through the resistor network shown to the circuits which supply the early and late gate sampling pulses EG and LG.

The Y bias input terminal 38 is connected to ground through a resistor R1 while the Y channel gain control terminals 40, 42 are coupled to a gain control network including reverse-connected diodes D1 and D2, resistors R2 and R3 and a potentiometer P2 which is tied to the negative side of a 15 volt power supply circuit. Diodes D1 and D2 establish a "dead zone" in the gain of the Y channel such that the gain is clamped at zero despite some slight drift in the base level of the signals presented to the Y input port. The X bias input terminal 56 is connected to ground through a resistor R4 while the X channel gain control terminals 52, 54 are shunted through a resistor R5.

The plus output terminal 50, which provides multiplier output signal M, is connected to the base of an emitter follower T1 and is also tied to ground a resistor R7 and a power supply bypass capacitor C2. Load circuit gain control is additionally provided through connection of the R7-C2 junction point to control terminal 48 through a resistor R6. The minut output terminal 46 is tied to the same junction point through a resistor R11. Bias terminal 44 is connected to the 15 volt supply.

The circuit for coupling the output of emitter follower T1 to the input of integrating 18 includes a coupling capacitor C1, a pair of bias resistors R8 and R9 and a pair of parallel connected, reversed diodes D3 and D4. The latter operate to provide a bipolar threshold to prevent charge from flowing into or out of the integrator 18 when no output signal is presented from the multiplier.

Figure 6:
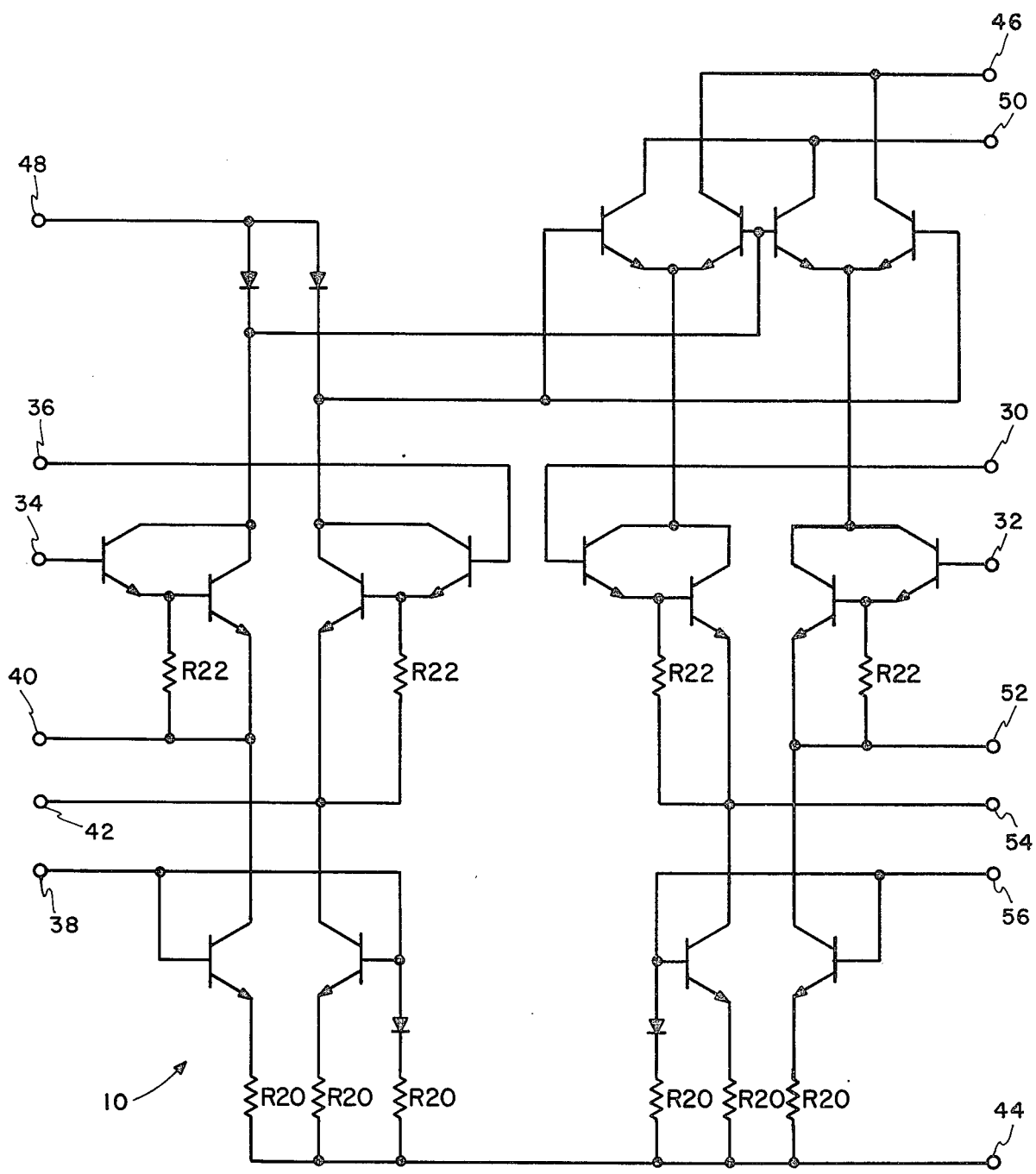
FIG. 6 is a detailed circuit schematic of the multiplier circuit of FIG. 5.

Resistance and capacitance values which may be used in the above circuit are as follows:

R1 — 3.16K
R2 — 56K
R3 — 56K
R4 — 3.16K
R5 — 1K
R6 — 1.1K
R7 — 1K
R8 — 2.7K
R9 — 3.6K
R10 — 487 ohms
R11 — 1K
P1 — 100 ohms
P2 — 10K
C1 — 0.1uf
C2 — 1uf
C3 — 0.47uf FIG. 6 shows the circuit schematic for the integrated circuit multiplier of FIG. 5. Resistors R22 may each be 4K resistors while the resistors R20 may each be 500 ohms.

It will be appreciated that various changes in the form and details of the above described preferred embodiment may be effected by persons of ordinary skill without departing from the true spirit and scope of the invention.

I claim:

1. A split gate pulse tracking circuit comprising, in combination:
    a multiplier having first and second input ports and an output port;
    means for applying a video signal containing a pulse to be tracked to said first input port;
    means for generating sequential and contiguous early and late gate sampling pulses and for applying said pulses to said second input port, said sampling pulses being received by said multiplier in opposite polarity states such that the output produced by said multiplier coincident with said sampling pulses is a bipolar representation of a portion of said video signal;
    integrating means connected to said output port for integrating the multiplier output signal; and
    means responsive to changes in the output of said integrating means for shifting the timing of said early and late gate pulses.

2. The combination set forth in claim 1 wherein said multiplier comprises an integrated circuit multiplier.

3. The combination set forth in claim 1 wherein said means for generating said sampling pulses is constructed and arranged to generate positive-going early and late gate pulses and wherein said second input port of said multiplier includes a pair of positive and negative input terminals each connected to receive one of said pulses.

4. The combination set forth in claim 1 wherein said integrating means comprises an operational amplifier having a feedback capacitor for integrating said multiplier output.

5. The combination set forth in claim 3 further comprising means for holding the gain of the multiplier channel connected to said second input port at zero so long as said early and late gate sampling pulses are not present at said input port.

* * * * *